(12) United States Patent
McCorkendale et al.

(10) Patent No.: US 9,569,205 B1
(45) Date of Patent: Feb. 14, 2017

(54) SYSTEMS AND METHODS FOR REMOTELY CONFIGURING APPLICATIONS

(71) Applicant: Symantec Corporation, Mountain View, CA (US)

(72) Inventors: Bruce McCorkendale, Manhattan Beach, CA (US); Thomas Enderwick, La Jolla, CA (US)

(73) Assignee: Symantec Corporation, Mountain View, CA (US)

( * ) Notice: Subject to any disclaimer, the term of this patent is extended or adjusted under 35 U.S.C. 154(b) by 423 days.

(21) Appl. No.: 13/914,599

(22) Filed: Jun. 10, 2013

(51) Int. Cl.
*G06Q 50/30* (2012.01)
*G06F 9/44* (2006.01)

(52) U.S. Cl.
CPC ..................................... *G06F 8/71* (2013.01)

(58) Field of Classification Search
CPC ....................................................... G06F 8/71
See application file for complete search history.

(56) References Cited

U.S. PATENT DOCUMENTS

| | | | | |
|---|---|---|---|---|
| 6,505,249 B1 * | 1/2003 | Rehkopf | ................. | H04L 29/06 702/182 |
| 6,513,024 B1 * | 1/2003 | Li | ....................... | G06N 99/005 706/13 |
| 6,668,340 B1 * | 12/2003 | Baker | ................. | G06F 11/3688 714/26 |
| 6,963,908 B1 * | 11/2005 | Lynch | ................ | G06F 9/44505 709/220 |
| 8,924,352 B1 * | 12/2014 | Andruss | .............. | G06F 11/1461 707/640 |
| 2002/0104080 A1 * | 8/2002 | Woodard | ........... | G06F 9/44505 717/176 |
| 2002/0138443 A1 * | 9/2002 | Schran | ................ | G06Q 20/382 705/64 |
| 2002/0161743 A1 * | 10/2002 | Brebner | ............ | G06F 17/30867 |
| 2004/0044992 A1 * | 3/2004 | Muller | ............... | G06F 11/3684 717/124 |
| 2004/0044993 A1 * | 3/2004 | Muller | ............... | G06F 11/3684 717/124 |
| 2004/0128651 A1 * | 7/2004 | Lau | ..................... | G06F 11/3664 717/124 |

(Continued)

OTHER PUBLICATIONS

U.S. Appl. No. 14/127,946, McClard, et al.*

*Primary Examiner* — Philip Chea
*Assistant Examiner* — Wuji Chen
(74) *Attorney, Agent, or Firm* — Fisherbroyles LLP

(57) ABSTRACT

A computer-implemented method for remotely configuring applications may include (1) identifying a centrally administered application that includes a configuration specification that defines at least one setting available for the centrally administered application and that is prepared to provide the configuration specification, (2) identifying, by extracting the configuration specification for the centrally administered application, a settings field of the configuration specification, (3) creating a settings configuration policy that specifies a value for the settings field, (4) detecting an instance of the centrally administered application that includes the configuration specification, and (5) pushing the value for the settings field to the instance of the centrally administered application in accordance with the settings configuration policy. Various other methods, systems, and computer-readable media are also disclosed.

20 Claims, 7 Drawing Sheets

(56) References Cited

U.S. PATENT DOCUMENTS

| | | | |
|---|---|---|---|
| 2005/0015641 A1* | 1/2005 | Alur | G06F 11/1458 714/2 |
| 2007/0067587 A1* | 3/2007 | Rossi | G06F 11/1461 711/162 |
| 2007/0143827 A1* | 6/2007 | Nicodemus | G06F 21/6218 726/2 |
| 2008/0022360 A1* | 1/2008 | Bacastow | G06F 21/85 726/1 |
| 2008/0059610 A1* | 3/2008 | Lin | G06F 9/5061 709/220 |
| 2008/0086719 A1* | 4/2008 | Clemenceau | G06F 9/44505 717/121 |
| 2008/0183309 A1* | 7/2008 | Beers | G06F 9/4411 700/17 |
| 2009/0024992 A1* | 1/2009 | Kulaga | G06F 9/44505 717/177 |
| 2010/0146514 A1* | 6/2010 | Alexander | G06F 11/3688 718/104 |
| 2011/0066708 A1* | 3/2011 | Schran | G06Q 20/382 709/221 |
| 2011/0066999 A1* | 3/2011 | Rabinovich | G06F 8/51 717/104 |
| 2013/0019242 A1* | 1/2013 | Chen | H04L 41/145 718/1 |
| 2013/0035909 A1* | 2/2013 | Douady | 714/37 |
| 2014/0279922 A1* | 9/2014 | Kottomtharayil | G06F 9/505 703/2 |

* cited by examiner

SYSTEMS AND METHODS FOR REMOTELY CONFIGURING APPLICATIONS

BACKGROUND

Mobile applications are becoming increasingly popular for both individual use and within enterprises. Enterprise adoption of mobile applications may bring many new challenges not faced by those employing mobile applications for personal use. For example, enterprises may have policies that mandate specific settings or configurations for all applications used by company employees, and mobile applications may fall under these policies. Enterprise users may also require help configuring their mobile applications, increasing the burden on technical support staff. In addition, users who do not properly configure their mobile applications may risk violating company policy, exposing sensitive data, or a host of other problems.

Traditional systems for configuring applications may require users to individually configure each instance of an application. This may be impractical and inefficient if a large number of instances of a mobile application need to be configured similarly or identically by a large number of users, not all of whom may be technically savvy. Traditional systems may also fail to include remote configuration capabilities, requiring technical support personnel to either walk users through configuration or be physically present to configure the applications themselves. Accordingly, the instant disclosure identifies and addresses a need for additional and improved systems and methods for remotely configuring applications.

SUMMARY

As will be described in greater detail below, the instant disclosure generally relates to systems and methods for remotely configuring applications by extracting a configuration specification from the application, creating a settings policy based on the configuration specification, and pushing values based on the settings policy to one or more instances of the application.

In one example, a computer-implemented method for remotely configuring applications may include (1) identifying a centrally administered application that includes a configuration specification that defines at least one setting available for the centrally administered application and that is prepared to provide the configuration specification, (2) identifying, by extracting the configuration specification for the centrally administered application, a settings field of the configuration specification, (3) creating a settings configuration policy that specifies a value for the settings field, (4) detecting an instance of the centrally administered application that includes the configuration specification and (5) pushing the value for the settings field to the instance of the centrally administered application in accordance with the settings configuration policy.

In some examples, the computer-implemented method may further include preparing the centrally administered application to provide the configuration specification by wrapping the centrally administered application in a configuration function that provides the configuration specification.

In some examples, the computer-implemented method may further include wrapping the centrally administered application in a configuration function that receives the pushed value for the settings field and provides the pushed value for the settings field to the centrally administered application.

In some examples, the computer-implemented method may further include preparing the centrally administered application to provide the configuration specification by including a library in the centrally administered application that provides the configuration specification.

In some examples, the computer-implemented method may further include including in the centrally administered application a library that receives the pushed value for the settings field and provides the pushed value for the settings field to the centrally administered application.

In some examples, detecting an instance of the centrally administered application may include detecting that the instance of the centrally administered application is not currently configured by the settings configuration policy.

In one embodiment, the settings configuration policy may include a customized policy and the value for the settings field may be based at least in part on environmental data for the instance of the centrally managed application.

In one embodiment, the settings configuration policy may include a customized policy and the value for the settings field may be based at least in part on (1) a data loss prevention policy, (2) an active directory group of the instance of the centrally managed application, (3) a version indicator of the instance of the centrally managed application, (4) a location of a user of the instance of the centrally managed application, (5) a time zone of the user of the instance of the centrally managed application, (6) a privilege level of the user of the instance of the centrally managed application and/or (7) a lightweight directory access protocol group of the user of the instance of the centrally managed application.

In some examples, creating the settings policy may include (1) presenting, in a user interface, the settings field to an administrator of the centrally administrated application and (2) receiving the value for the settings field from the administrator via the user interface.

In one embodiment, a system for implementing the above-described method may include (1) an identification module that identifies a centrally administered application that includes a configuration specification that defines at least one setting available for the centrally administered application and that may be prepared to provide the configuration specification, (2) an extraction module that identifies, by extracting the configuration specification for the centrally administered application, a settings field of the configuration specification, (3) a creation module that creates a settings configuration policy that specifies a value for the settings field, (4) a detection module that detects an instance of the centrally administered application that includes the configuration specification, (5) a pushing module that pushes the value for the settings field to the instance of the centrally administered application in accordance with the settings configuration policy and (6) at least one processor configured to execute the identification module, the extraction module, the creation module, the detection module and the pushing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a centrally administered application that may include a configuration specification which may define at least one setting available for the centrally administered application and that may be prepared to provide the configuration specification, (2) identify, by extracting the configuration specification for the centrally administered application, a settings field of the configuration specification, (3) create a settings configuration policy that specifies a value for the settings field, (4) detect an instance of the centrally administered application that includes the configuration specification and (5) push the value for the settings field to the instance of the centrally administered application in accordance with the settings configuration policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
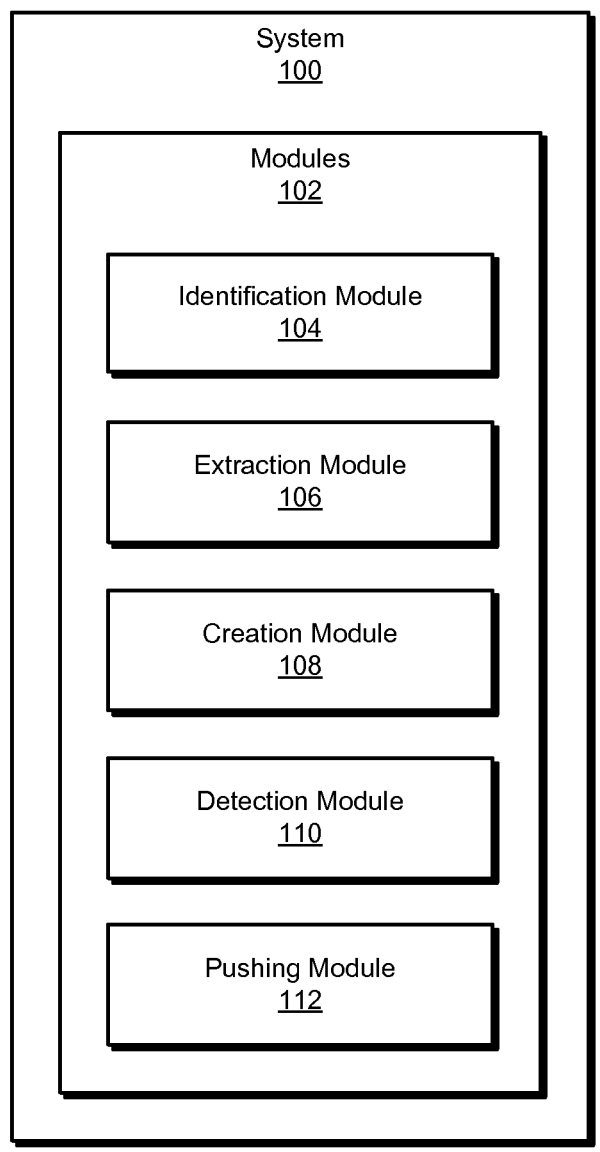
FIG. 1 is a block diagram of an exemplary system for remotely configuring applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents and alternatives falling within the scope of the appended claims.

DETAILED DESCRIPTION OF EXEMPLARY EMBODIMENTS

The present disclosure is generally directed to systems and methods for remotely configuring applications. As will be explained in greater detail below, by pushing settings values in accordance with a settings policy, mobile devices can be configured in accordance with company policies without requiring users to personally configure their individual mobile devices. The systems and methods described herein may thereby ensure broader compliance with company policies relating to devices, data, and/or applications, and/or may reduce the technical support required by users who may have difficulty configuring their own devices correctly.

Figure 2:
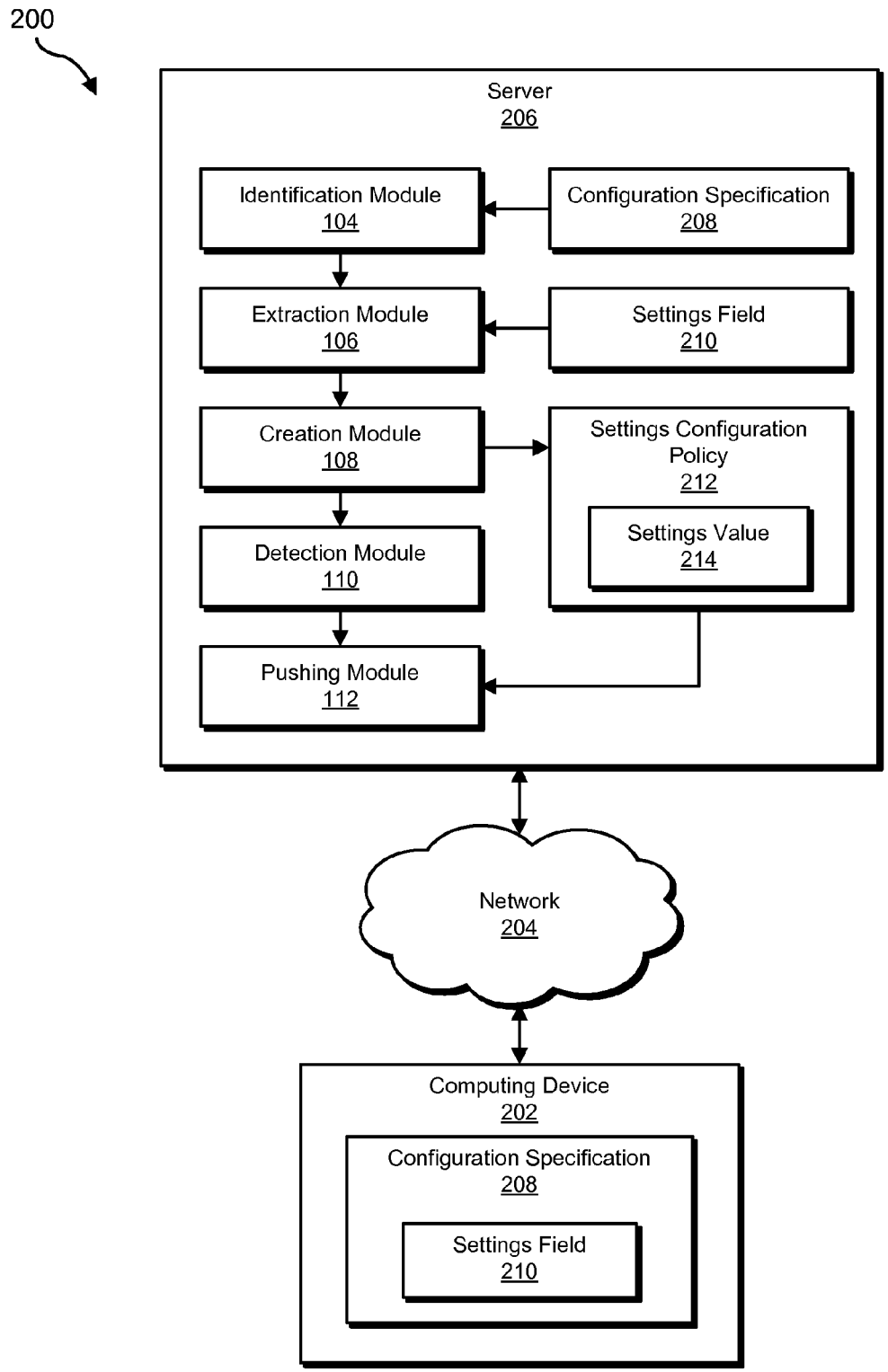
FIG. 2 is a block diagram of an exemplary system for remotely configuring applications.
Figure 3:
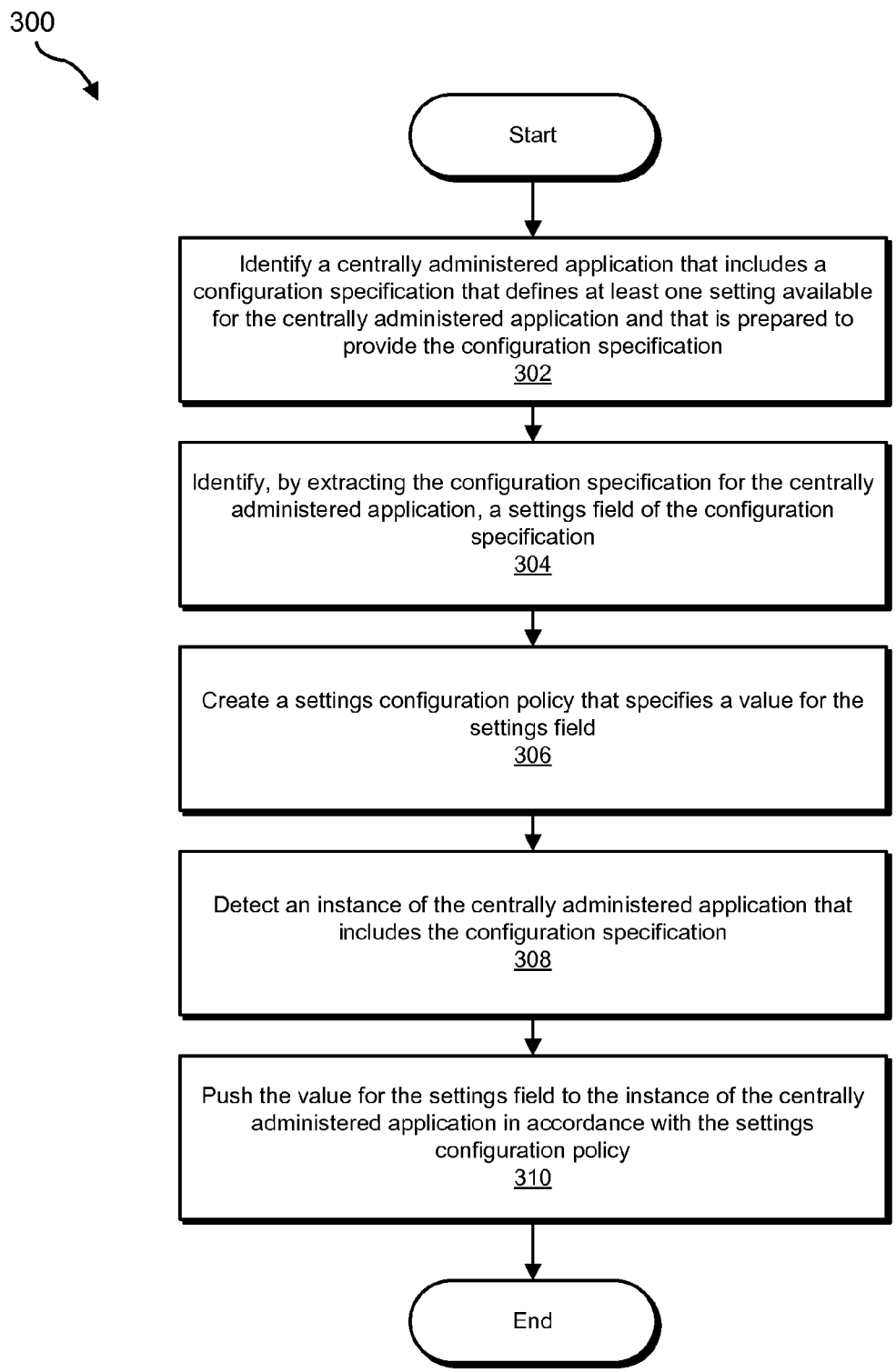
FIG. 3 is a flow diagram of an exemplary method for remotely configuring applications.
Figure 4:
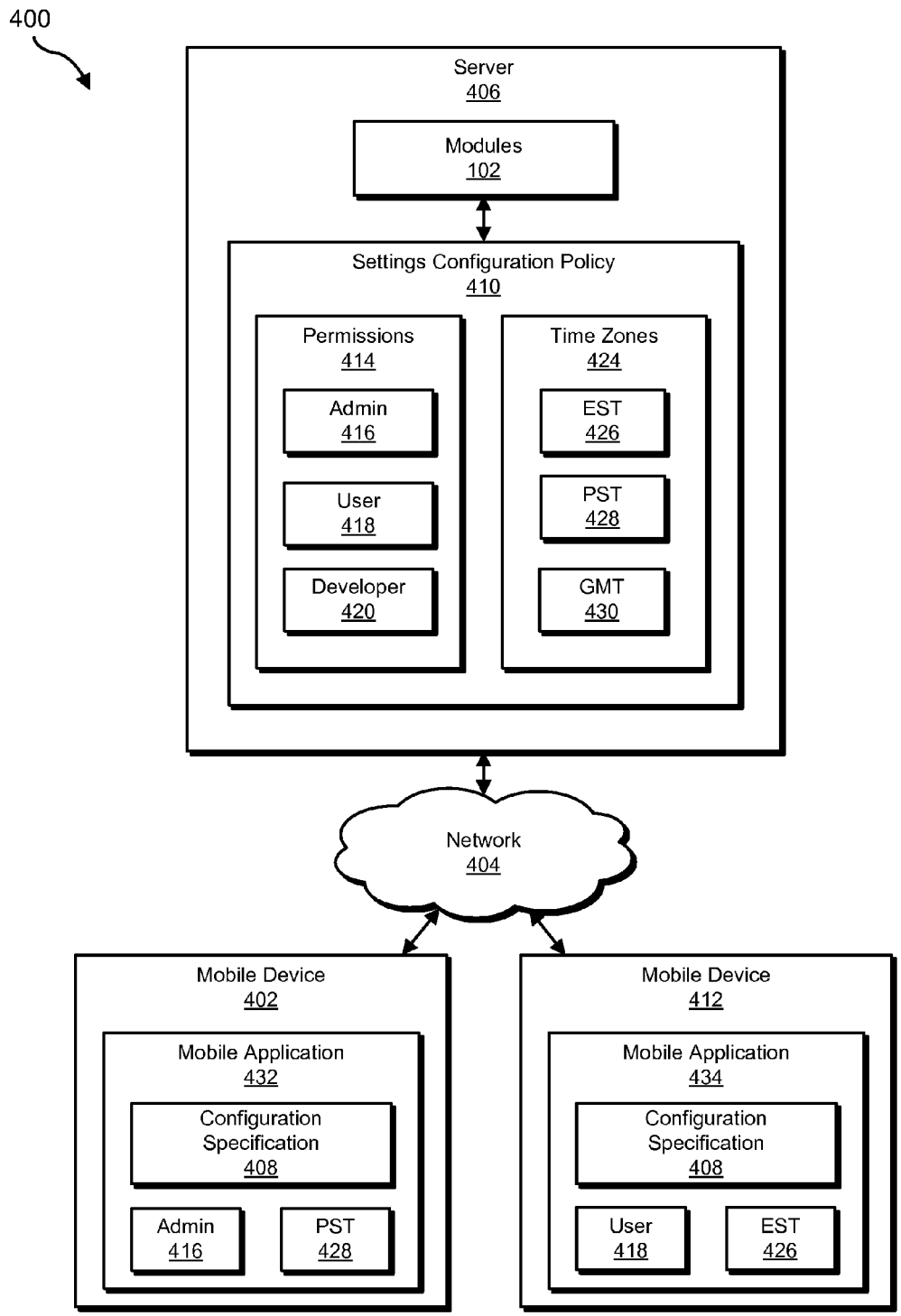
FIG. 4 is a block diagram of an exemplary system for remotely configuring applications.

The following will provide, with reference to FIGS. 1-2 and 4, detailed descriptions of exemplary systems for remotely configuring applications. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for remotely configuring applications. As illustrated in this figure, exemplary system 100 may include one or more modules 102 for performing one or more tasks. For example, and as will be explained in greater detail below, exemplary system 100 may include an identification module 104 that may identify a centrally administered application that includes a configuration specification that defines at least one setting available for the centrally administered application and that is prepared to provide the configuration specification. Exemplary system 100 may additionally include an extraction module 106 that may identify, by extracting the configuration specification for the centrally administered application, a settings field of the configuration specification. Exemplary system 100 may also include a creation module 108 that creates a settings configuration policy that specifies a value for the settings field. Exemplary system 100 may additionally include a detection module 110 that detects an instance of the centrally administered application that includes the configuration specification. Exemplary system 100 may also include a pushing module 112 that pushes the value for the settings field to the instance of the centrally administered application in accordance with the settings configuration policy. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102. Additionally or alternatively, server 206 may be programmed with one or more of modules 102.

In one embodiment, one or more of modules 102 from FIG. 1 may, when executed by at least one processor of computing device 202 and/or server 206, facilitate computing device 202 and/or server 206 in remotely configuring applications. For example, and as will be described in greater detail below, one or more of modules 102 may cause computing device 202 and/or server 206 to remotely configuring applications. In particular, and as will be described in greater detail below, identification module 104 may be programmed to identify a centrally administered application that includes a configuration specification 208 that defines at least one setting available for the centrally administered application and that is prepared to provide configuration specification 208. Extraction module 106 is programmed to identify, extracting configuration specification 208 for the centrally administered application, a settings field 210 of configuration specification 208. Creation module 108 may be programmed to create a settings configuration policy 212 that specifies a settings value 214 for settings field 210. Detection module 110 may be programmed to detect an instance of the centrally administered application that includes configuration specification 208. Pushing module 112 may be programmed to push settings value 214 for settings field 210 to the instance of the centrally administered application in accordance with settings configuration policy 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of storing, extracting and/or pushing information about applications and/or configuration specifications. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

FIG. 3 is a flow diagram of an exemplary computer-implemented method 300 for remotely configuring applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a centrally administered application that may include a configuration specification that defines at least one setting available for the centrally administered application and that is prepared to provide the configuration specification. For example, at step 302 identification module 104 may, as part of computing device 202 in FIG. 2, identify a centrally administered application that may include configuration specification 208 that defines at least one setting available for the centrally administered application and that is prepared to provide configuration specification 208.

As used herein, the phrase "centrally administered application" may refer to any application that may be monitored, modified, updated, installed, uninstalled, or otherwise affected by a remote provisioning system. Examples include, without limitation, mobile applications that may be affected by mobile application management software and/or applications that may be downloaded and/or updated via application stores.

Identification module 104 may identify the centrally administered application in any of a variety of contexts. For example, identification module 104 may identify the centrally administered application within a publicly accessible application store. Additionally or alternatively, identification module 104 may identify the centrally administered application within a private repository of applications for an enterprise and/or organization.

In one example, identification module 104 may identify a mobile application that is available in an application store and that includes a configuration file that may include settings for the application. As another example, identification module 104 may identify a virtual meeting application that may be available in the IPLAY application store and that may include an XML file with settings for the virtual meeting application.

Identification module 104 identify the centrally administered application in any suitable manner. For example, identification module 104 may identify the centrally administered application by iterating through applications that are available in an application store and/or repository. In some examples, identification module 104 may identify the centrally administered application by querying an application store and/or repository with an identifier of the application (e.g., a name, an id number, and/or a hash of the application). Additionally or alternatively, identification module 104 may identify the centrally administered application by identifying an instance of the application installed on a centrally administered mobile device.

In some embodiments, the systems described herein may prepare the centrally administered application to provide the configuration specification by wrapping the centrally administered application in a configuration function that may provide the configuration specification. As used herein, the phrase "configuration function" may refer to any function that may add functionality to an application. For example, the configuration function may provide a configuration specification for the application. In one example, a mobile application for the ANDROID platform may be wrapped with a function that may provide the "preferences.xml" file for the mobile application to the ANDROID mobile application store.

In some embodiments, the systems described herein may prepare the centrally administered application to provide the configuration specification by including in the centrally administered application a library that provides the configuration specification. The library may include functions that allow the application to provide the configuration specification to a specific application store and/or to any application and/or server that requests the configuration specification. For example, a mobile application for IOS may include a library that may be configured to provide the settings bundle to the APPLE application store.

Returning to FIG. 3, at step 304 one or more of the systems described herein may identify, by extracting the configuration specification for the centrally administered application, a settings field of the configuration specification. For example, at step 304 extraction module 106 may, as part of computing device 202 in FIG. 2, identify, by extracting configuration specification 208 for the centrally administered application, settings field 210 of configuration specification 208.

Extraction module 106 may extract the configuration specification for the centrally administered application in any of a variety of ways. For example, extraction module 106 may extract a configuration file from an instance of the centrally administered application that is installed on an end-user device (e.g., a mobile application installed on a mobile device). Additionally or alternatively, extraction module 106 may extract the configuration file from a copy of the application within an application store and/or repository.

In one example, extraction module 106 may extract a settings XML file from the virtual meeting application. The settings XML file may include settings fields including time zone, permissions level, default volume, display name, and/or display icon. In some embodiments, extraction module 106 may extract a configuration specification by receiving the configuration specification from an external source. For example, a developer may submit a version of an application to an application store and may also submit the configuration file for the version of the application to the application store.

At step 306, one or more of the systems described herein may create a settings configuration policy that specifies a value for the settings field. For example, at step 306 creation module 108 may, as part of computing device 202 in FIG. 2, create a settings configuration policy 212 that specifies a settings value 214 for settings field 210.

Creation module 108 may create the settings configuration policy in any suitable manner. In some examples, creation module 108 may create the settings configuration policy based on input received from an administrator specifying the value for the settings field. For example, creation module 108 may present a user interface that includes settings field information from the configuration specification and that allows an administrator to input field values to push to instances of the application. In some examples, creation module 108 may create the settings configuration policy based on one or more default settings field values specified for an organization and/or enterprise. In these examples, creation module 108 may match recognized field names with preconfigured default settings stored in a default settings repository.

In some examples, creation module 108 may create a settings configuration policy for the application that specifies values for multiple fields specified in the configuration specification for the application.

In one example, creation module 108 may create a settings configuration policy for the virtual meeting application. The settings configuration policy may specify values for the settings fields in the settings configuration file. For example, the time zone may be specified as Pacific Standard Time, the permissions level may be specified as "user," the default volume may be specified as "5," the display name may be specified as the name of the user of the application, and/or the display icon may be specified as a default corporate icon.

In some examples, creation module 108 may create a settings configuration policy that includes a customized policy where the value for the settings field is based at least in part on environmental data for the instance of the centrally managed application. For example, the value of a "time zone" field may be based on the geographic location of the instance of the centrally managed application. In one example, an application authenticating to the network from an IP address in California may receive a time zone value of "Pacific Standard Time."

In some examples, creation module 108 may create a settings configuration policy by including a customized policy where the value is based at least in part on (1) a data loss prevention policy, (2) an active directory group of the instance of the centrally managed application, (3) a version indicator of the instance of the centrally managed application, (4) a location of a user of the instance of the centrally managed application, (5) a time zone of the user of the instance of the centrally managed application, (6) a privilege level of the user of the instance of the centrally managed application and/or (7) a lightweight directory access protocol group of the user of the instance of the centrally managed application. For example, creation module 108 may generate customized configurations for each instance of the application managed by creation module 108 based on profile information for the corresponding user of each instance of the application. Creation module 108 may access the profile information from each user in any of a variety of ways, including, without limitation, querying a specified database of users, using a directory services protocol such as the Lightweight Directory Access Protocol, and/or retrieving the user profile information from another application (e.g., MICROSOFT OFFICE).

FIG. 4 is a block diagram of an exemplary computing system 400 for remotely configuring applications. Exemplary computing system 400 may provide an example of customized policies for configuring different mobile devices. For example, server 406 may include modules 102 and/or settings configuration policy 410. Settings configuration policy 410 may include a plurality of values for settings fields, including, in some examples, permissions 414 and/or time zones 424. Permissions 414 may include values admin 416, user 418 and/or developer 420. Permissions 414 may include configuration information specifying that permissions value should be based on the permissions level of the user of the instance of a mobile application. Time zones 424 may include values EST 426, PST 428 and/or GMT 430. Time zones 424 may include configuration information specifying that the time zone value should be based on the geographical location of the instance of the mobile application.

Mobile device 402 may be connected to server 406 by network 404. Mobile device 402 may include mobile application 432, which may include configuration specification 408. Mobile device 402 may be located in the Pacific Standard time zone, and therefore mobile application 432 may be configured with PST 428. Mobile device 402 may also be operated by a user with administrative privileges, and therefore mobile application 432 may be configured with admin 416 as its permissions setting.

Mobile device 412 may be also connected to server 406 by network 404. Mobile device 412 may include mobile application 442, which may include configuration specification 408. Mobile device 412 may be located in the Eastern Standard time zone, and, therefore, mobile application 442 may be configured with EST 426. Mobile device 412 may also be operated by a user with normal user permissions, and, therefore, mobile application 442 may be configured with user 418 as its permissions setting.

In some examples, creation module 108 may create a settings configuration policy by presenting, in a user interface, the settings field to an administrator of the centrally administrated application and/or receiving the value for the settings field from the administrator via the user interface. In some examples, creation module 108 may recreate the user interface of the mobile application and use that user interface to present the settings field to the administrator. For example, a virtual meeting application may have a settings panel which may include a drop-down box for time zones and a number field for default volume level. Creation module 108 may create a user interface including a drop-down box for time zones and a number field for default volume level for the administrator to use in specifying the values for those fields.

Returning to FIG. 3, at step 308 one or more of the systems described herein may detect an instance of the centrally administered application that may include the configuration specification. For example, at step 308 detection module 110 may, as part of computing device 202 in FIG. 2, detect an instance of the centrally administered application that may include configuration specification 208.

Detection module 110 may detect the instance of the centrally administered application in any suitable manner. For example, detection module 110 may retrieve a list of devices (e.g., managed by an enterprise) that have the application installed. Additionally or alternatively, detection module 110 may query one or more devices managed by an organization to determine whether the device has the application installed. In some examples, detection module 110 may retrieve information about which devices have the application installed by querying an application store and/or repository. In some examples, detection module 110 may operate as a part of one or more devices that have the application installed, and detection module 110 may scan the devices for evidence that the application is installed.

In some examples, detection module 110 may detect an instance of the mobile application that may include a configuration file. In one example, detection module 110 may detect an instance of the virtual meeting application that may have just authenticated to an application center and may include an XML settings configuration file.

In some examples, detection module 110 may detect an instance of the centrally administered application by detecting that the instance of the centrally administered application may not be currently configured by the settings configuration policy. In some embodiments, the configuration specification may include a flag indicating whether the application may have been configured by the settings configuration policy. In some embodiments, detection module 110 may determine whether the application may have been configured by the settings configuration policy by examining the current settings of the application. In some examples, the application may be authenticating to the application store for the first time and may never have been configured by the settings configuration policy.

Returning to FIG. 3, at step 310 one or more of the systems described herein may push the value for the settings field to the instance of the centrally administered application in accordance with the settings configuration policy. For example, at step 310 pushing module 112 may, as part of computing device 202 in FIG. 2, push settings value 214 for settings field 210 to the instance of the centrally administered application in accordance with settings configuration policy 212.

Pushing module 112 may push the value for the settings field in any of a variety of ways. For example, pushing module 112 may be located on a server (e.g., a central administration server for administering instances of the application), and may communicate with a configuration module which may receive and/or pull settings from the pushing module. The application may be wrapped with the configuration module that may also inject the settings field into a configuration file of the application when the application is executed. Additionally or alternatively, the application may be configured to accept instructions from pushing module 112 (e.g., as a part of a library included in the application). In this example, pushing module 112 may push the value for the settings field to the instance of the centrally administered application via an application programming interface made available by the library. Additionally or alternatively, pushing module 112 may communicate with a receiving and/or pulling module which may operate as a part of the library bundled within the application and may set the settings field with the value upon receiving the value via the application programming interface.

In some examples, pushing module 112 may push one or more values for one or more settings fields to an instance of a mobile application. In these examples, the values may have been specified by a settings configuration policy.

In one example, pushing module 112 may push values for time zone, permissions level, default volume, display name, and/or display icon to the virtual meeting application. The configuration policy may specify that time zone may be based on geographic location, and so pushing module 112 may push the value "PST" based on the mobile device authenticating from California. The configuration policy may also specify that the permissions level may be based on the job title of the user of the mobile device, and pushing module 112 may push the permissions value "user" based on the user of the mobile device not having an administrator job title. The configuration policy may specify that default volume may be "5" for all instances of the mobile application, and pushing module 112 may push the value "5" for the field "volume." The configuration policy may not specify a default value for the display name and pushing module 112 may push a blank value and/or may not include the field "display name" when pushing values. The configuration policy may specify a default icon for the display icon and pushing module 112 may push the default icon.

In some embodiments, pushing module 112 may push the value for the settings field by wrapping the centrally administered application in a configuration function that may receive the value for the settings field from pushing module 112. In some examples, the configuration function may include a function that provide values for the settings field to the application. In one example, the configuration function may allow a server to remotely update the values for the settings of a mobile application which may normally only be updated locally. For example, the configuration function may interact with the server to receive the value for the settings field and transparently make the value for the settings field available to the wrapped application as though the value had been set locally by a user.

In some embodiments, pushing module 112 may push the value for the settings field by including in the centrally administered application a library that may receive and/or pull the value for the settings field. The library may include functions that may allow the settings file for the application to be remotely updated. For example, the library may include an application programming interface for updating application settings. In one example, the library may include a function allowing an administrator to remotely push values for settings fields to a mobile application. In some examples, the library may update the application with settings values received from pushing module 112 by utilizing the application's settings read functionality.

Figure 5:
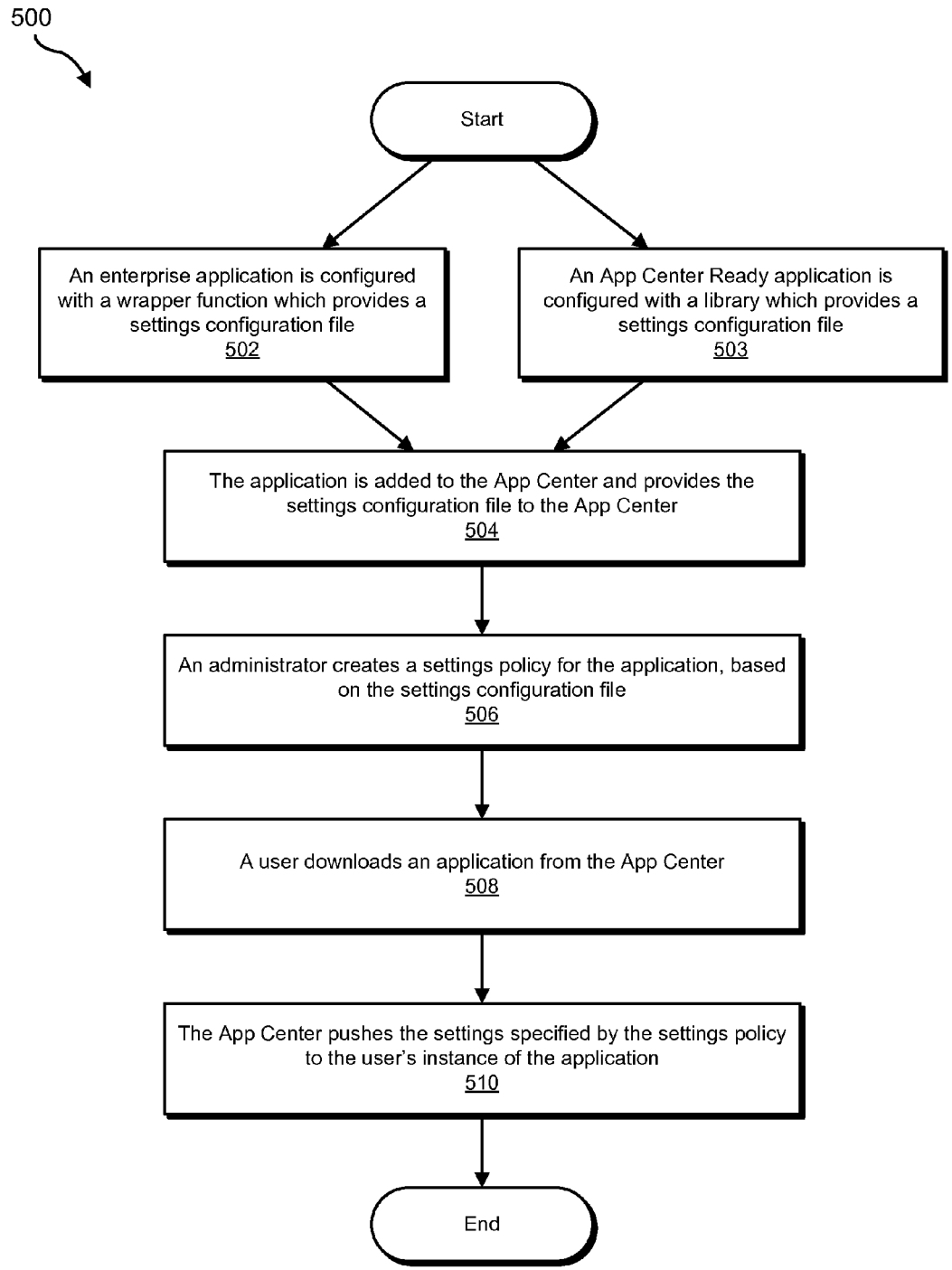
FIG. 5 is a flow diagram of an exemplary method for remotely configuring applications.

FIG. 5 is a flow diagram of an exemplary computing method 500 for remotely configuring applications. In some examples, at step 502 an application may be configured with a wrapper function that may provide a settings configuration file. An enterprise application may be written by or for an enterprise, and may be wrapped and distributed to end users directly by the enterprise, in some cases via an application store. In some examples, at step 503 an App Center Ready (ACR) application may be configured with a library that may provide a settings configuration file.

As used herein, the phrase "App Center" may generally refer to any server and/or system which may host applications and/or updates for applications, including, without limitation, application stores. As used herein, the phrase "App Center Ready application" (or "ACR application") may refer to any application that may include application security and/application or management features provided by a third party. In some examples, the phrase "App Center Ready application" may refer to an application that is prepared for distribution through one or more application stores, such as ITUNES and/or IPLAY. In some examples, after installation on a device, an instance of an ACR application may be bound to an application management system that is also on the device and that is controlled by the same third party.

At step 504, the application may be added to the App Center and may provide a settings configuration file to the App Center. When an enterprise application is wrapped, the App Center server may capture the settings definition XML and/or may associate the settings definition XML with the application version. When an ACR application is approved, a process may capture the settings definition XML file. There may be a feed of ACR application settings definition XML files that may be accessed by App Center servers.

At step 506, an administrator may create a settings policy for the application based on the settings configuration file. The settings policy may include values or formulas (including conditions) for any or all of the settings fields. Formulas may include values derived from local directory access protocol (LDAP) and/or other databases, values generated by a script, or a combination of all of these. For example, the value of a given setting may be dependent on user's LDAP group and/or may be a function of other settings, such as the geographic location of the user. The settings policy may take into account differences between application versions, as the system may be aware of changes to the settings definition XML between application versions.

At step 508, a user may download an application from the App Center. The user may configure some of the application settings manually. The user may also manually trigger a request for automatic configuration.

At step 510, the App Center may push the settings specified by the settings policy to the user's instance of the application. When a wrapped application authenticates with App Center, new settings values may be automatically pushed to the wrapper function. The wrapper function may then inject the settings values into the application. On platforms where the settings may be altered by the application logic, the wrapper function may directly update the settings. On platforms where the application logic cannot directly alter the settings, the wrapper function may use the settings read functions to supplies the pushed values.

As explained above in connection with method 300 in FIG. 3, a mobile application may be configured to provide a settings configuration specification. The mobile application may be configured by the use of a wrapper function and/or the inclusion of a library. The mobile application may also be made available in an application store.

In one example, the systems described herein may extract the configuration specification and provide it to an administrator, who may create a settings configuration policy for the mobile application. The settings configuration policy may include customized values based on environmental variables for an instance of the application, such as the location of the instance of the mobile application, the privilege level of the user of the instance of the application, and/or the version of the instance of the mobile application.

In this example, a user may download an instance of the mobile application from the application store. The systems described herein may then push settings values to the user's instance of the mobile application in accordance with the settings configuration policy. This may ensure that the instance of the mobile application is properly configured and complies with company policies for mobile applications without requiring the user to configure their instance of the mobile application personally. This may in turn lead to more effective enforcement of company policies and/or a reduction of technical support needs for users of mobile devices.

Figure 6:
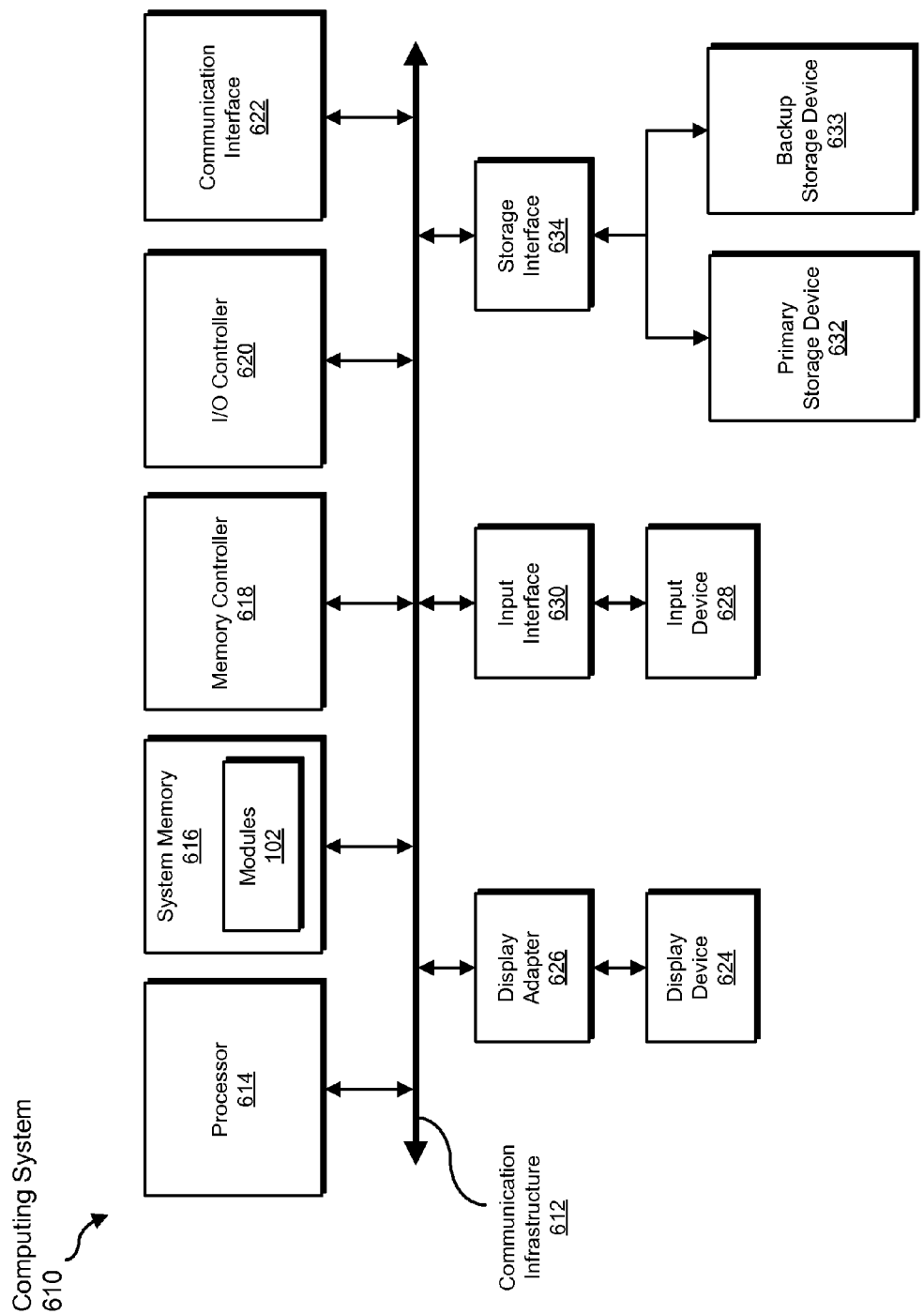
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O)

controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
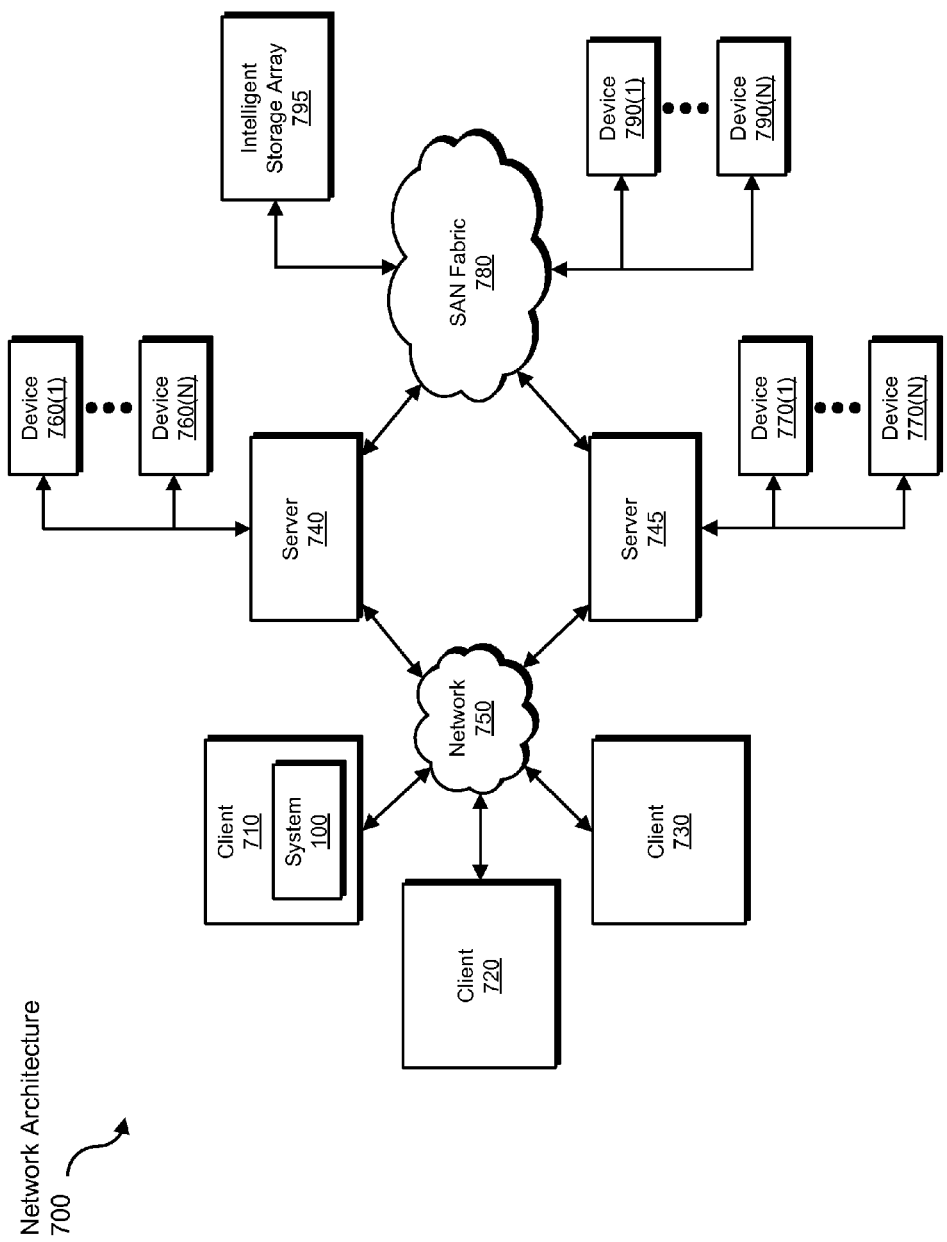
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for remotely configuring applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a configuration specification to be transformed, transform the configuration specification, output a result of the transformation to a server, use the result of the transformation to configure devices, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for remotely configuring applications, at least a portion of the method being performed by a computing device comprising at least one processor, the method comprising:
   identifying a centrally administered application that, before preparation, comprises a configuration specification that, when the centrally administered application is installed on a computing system, specifies to the computing system at least one setting according to which the centrally administered application is to operate on the computing system, wherein the centrally administered application is prepared to provide the configuration specification;
   identifying, by extracting the configuration specification for the centrally administered application, a settings field of the configuration specification;
   matching, by identifying the settings field via extracting the configuration specification for the centrally administered application, a field name of the settings field to at least one preconfigured setting stored in a settings repository;
   matching, by identifying an additional settings field via extracting an additional configuration specification for an additional centrally administered application, an additional field name of the settings field to the preconfigured setting stored in the settings repository;
   creating, based on matching the field name to the preconfigured setting, a settings configuration policy that specifies a value with which to populate the settings field;
   creating, based on matching the additional field name to the preconfigured setting, an additional settings configuration policy that specifies an additional value with which to populate the settings field;
   detecting an instance of the centrally administered application that comprises the configuration specification;
   detecting an instance of the additional centrally administered application that comprises the additional configuration specification;
   pushing the value for the settings field to the instance of the centrally administered application in accordance with the settings configuration policy;
   pushing the additional value for the settings field to the instance of the additional centrally administered application in accordance with the additional settings configuration policy.

2. The computer-implemented method of claim 1, further comprising preparing the centrally administered application to provide the configuration specification by wrapping the centrally administered application in a configuration function that provides the configuration specification.

3. The computer-implemented method of claim 1, further comprising wrapping the centrally administered application in a configuration function that receives the pushed value for the settings field and provides the value for the settings field to the centrally administered application.

4. The computer-implemented method of claim 1, further comprising preparing the centrally administered application to provide the configuration specification by including a library in the centrally administered application that provides the configuration specification.

5. The computer-implemented method of claim 1, further comprising including in the centrally administered application a library that receives the pushed value for the settings field and provides the value for the settings field to the centrally administered application.

6. The computer-implemented method of claim 1, wherein detecting the instance of the centrally administered application comprises detecting that the instance of the centrally administered application is not currently configured by the settings configuration policy.

7. The computer-implemented method of claim 1, wherein the settings configuration policy comprises a customized policy and the value for the settings field is based at least in part on environmental data for the instance of the centrally managed application.

8. The computer-implemented method of claim 1, wherein the settings configuration policy comprises a customized policy and the value for the settings field is based at least in part on at least one of:
   a data loss prevention policy;
   an active directory group of the instance of the centrally managed application;
   a version indicator of the instance of the centrally managed application;
   a location of a user of the instance of the centrally managed application;
   a time zone of the user of the instance of the centrally managed application;
   a privilege level of the user of the instance of the centrally managed application;
   a lightweight directory access protocol group of the user of the instance of the centrally managed application.

9. The computer-implemented method of claim 1, wherein creating the settings policy comprises:
   presenting, in a user interface, the settings field to an administrator of the centrally administrated application;
   receiving the value for the settings field from the administrator via the user interface.

10. A system for remotely configuring applications, the system comprising:
   an identification module that identifies a centrally administered application that, before preparation, comprises a configuration specification that, when the centrally administered application is installed on a computing system, specifies to the computing system at least one setting according to which the centrally administered application is to operate on the computing system, wherein the centrally administered application is prepared to provide the configuration specification;
   an extraction module that:
      identifies, by extracting the configuration specification for the centrally administered application, a settings field of the configuration specification;
      matches, by identifying the settings field via extracting the configuration specification for the centrally administered application, a field name of the settings field to at least one preconfigured setting stored in a settings repository;
      matches, by identifying an additional settings field via extracting an additional configuration specification for an additional centrally administered application, an additional field name of the settings field to the preconfigured setting stored in the settings repository;
   a creation module that:

creates, based on matching the field name to the preconfigured setting, a settings configuration policy that specifies a value with which to populate the settings field;
creates, based on matching the additional field name to the preconfigured setting, an additional settings configuration policy that specifies an additional value with which to populate the settings field;
a detection module that:
detects an instance of the centrally administered application that comprises the configuration specification;
detects an instance of the additional centrally administered application that comprises the additional configuration specification;
a pushing module that:
pushes the value for the settings field to the instance of the centrally administered application in accordance with the settings configuration policy;
pushes the additional value for the settings field to the instance of the additional centrally administered application in accordance with the additional settings configuration policy;
at least one hardware processor configured to execute the identification module, the extraction module, the creation module, the detection module and the pushing module.

11. The system of claim 10, further comprising a preparing module that prepares the centrally administered application to provide the configuration specification by wrapping the centrally administered application in a configuration function that provides the configuration specification.

12. The system of claim 10, further comprising a wrapping module that wraps the centrally administered application in a configuration function that receives the pushed value for the settings field and provides the pushed value for the settings field to the centrally administered application.

13. The system of claim 10, further comprising a preparing module that prepares the centrally administered application to provide the configuration specification by including a library in the centrally administered application that provides the configuration specification.

14. The system of claim 10, further comprising a configuring module that includes in the centrally administered application a library that receives the pushed value for the settings field and provides the pushed value for the settings field to the centrally administered application.

15. The system of claim 10, wherein the detection module detects the instance of the centrally administered application by detecting that the instance of the centrally administered application is not currently configured by the settings configuration policy.

16. The system of claim 10, wherein the settings configuration policy comprises a customized policy and the value for the settings field is based at least in part on environmental data for the instance of the centrally managed application.

17. The system of claim 10, wherein the settings configuration policy comprises a customized policy and the value for the settings field is based at least in part on at least one of:
a data loss prevention policy;
an active directory group of the instance of the centrally managed application;
a version indicator of the instance of the centrally managed application;
a location of a user of the instance of the centrally managed application;
a time zone of the user of the instance of the centrally managed application;
a privilege level of the user of the instance of the centrally managed application;
a lightweight directory access protocol group of the user of the instance of the centrally managed application.

18. The system of claim 10, wherein the creation module creates the settings policy by:
presenting, in a user interface, the settings field to an administrator of the centrally administrated application;
receiving the value for the settings field from the administrator via the user interface.

19. A non-transitory computer-readable-storage medium comprising one or more computer-readable instructions that, when executed by at least one processor of a computing device, cause the computing device to:
identify a centrally administered application that, before preparation, comprises a configuration specification that, when the centrally administered application is installed on a computing system, specifies to the computing system at least one setting according to which the centrally administered application is to operate on the computing system, wherein the centrally administered application defines at least one setting available for the centrally administered application and that is prepared to provide the configuration specification;
identify, by extracting the configuration specification for the centrally administered application, a settings field of the configuration specification;
match, by identifying the settings field via extracting the configuration specification for the centrally administered application, a field name of the settings field to at least one preconfigured setting stored in a settings repository;
match, by identifying an additional settings field via extracting an additional configuration specification for an additional centrally administered application, an additional field name of the settings field to the preconfigured setting stored in the settings repository;
create, based on matching the field name to the preconfigured setting, a settings configuration policy that specifies a value with which to populate the settings field;
create, based on matching the additional field name to the preconfigured setting, an additional settings configuration policy that specifies an additional value with which to populate the settings field;
detect an instance of the centrally administered application that comprises the configuration specification;
detect an instance of the additional centrally administered application that comprises the additional configuration specification;
push the value for the settings field to the instance of the centrally administered application in accordance with the settings configuration policy;
pushes the additional value for the settings field to the instance of the additional centrally administered application in accordance with the additional settings configuration policy.

20. The non-transitory computer-readable-storage medium of claim 19, wherein the one or more computer-readable instructions cause the computing device to prepare the centrally administered application to provide the configuration specification by wrapping the centrally administered application in a configuration function that provides the configuration specification.

* * * * *